April 1, 1930.　　　　V. GENKIN　　　　1,752,947

PROTECTIVE SYSTEM

Filed Dec. 23, 1924

INVENTOR
Vladimir Genkin.
BY
ATTORNEY

Patented Apr. 1, 1930

1,752,947

UNITED STATES PATENT OFFICE

VLADIMIR GENKIN, OF MARSEILLE, FRANCE

PROTECTIVE SYSTEM

Application filed December 23, 1924, Serial No. 757,620, and in Belgium March 21, 1924.

My invention relates to protective systems and particularly to relay protective systems for unbalanced polyphase circuits.

An object of my invention is to provide protective means for an unbalanced polyphase circuit that is responsive to a symmetrical component of an electrical quantity of the unbalanced circuit and is therefore independent of the particular causes of the unbalanced condition, such as short-circuits between phases, grounded conductors or the like.

Another object of my invention is to provide a means whereby the zero phase-sequence components may be eliminated from a protective means for a polyphase system.

In the accompanying drawings, Fig. 1 is a diagrammatic view of a protective system embodying my invention;

Figure 1:
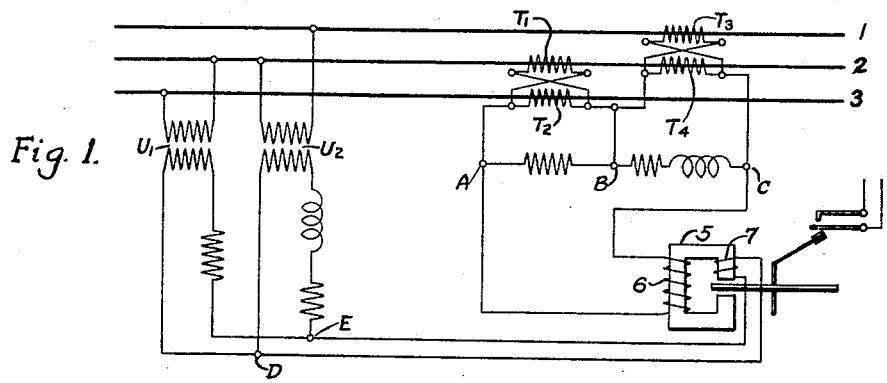

Referring to the drawings, in Fig. 1 is shown a directional wattmeter relay 5 that is arranged to determine the direction of the flow of electrical power consumed in a fault at the time of a short-circuit or an accidental ground. The current winding 6 of relay 5 is supplied with current and the voltage winding 7 is supplied with voltage proportional to the positive phase-sequence components of the current and voltage, respectively, of the circuit to which it is connected, the phases of said circuit represented as 1, 2 and 3.

The wattmeter element of the relay connected according to Fig. 1 is subjected only to the direct-rotational symmetrical component of the total power. This arrangement presents a marked advantage over the current method in consequence of the particular properties of the direct-rotational symmetrical component of power which never entirely disappears and which preserves the same sign, regardless of the unbalancing of the voltages and currents and whether or not the fault is accompanied by a ground.

It follows that a relay connected in this manner will function correctly and in the same manner in the immediate proximity of the fault and in the case of a zero-resistance dead short-circuit when the power absorbed by the fault is substantially zero.

Figure 2:
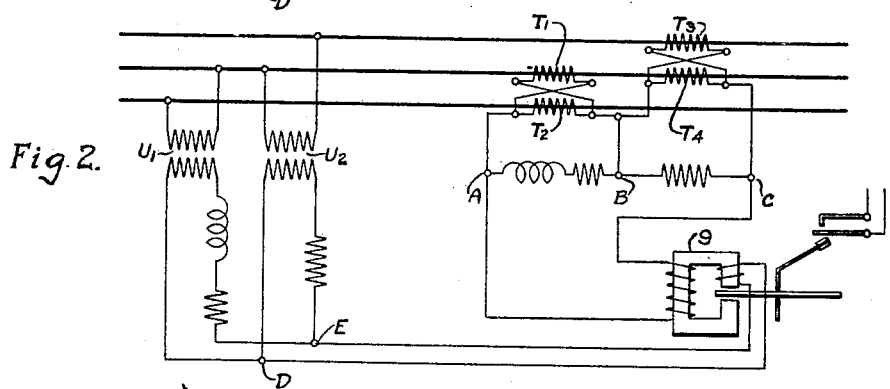
Fig. 2 is a similar view of a system that is responsive to the symmetrical component of opposite phase-sequence.

In Fig. 2 is shown a wattmeter relay 9 suitable for selectively operating the trip coils of a plurality of circuit-interrupters arranged in series and traversed by the same fault current. In this case, the windings of the wattmeter element of the relay are so energized that the relay 9 is actuated by the counter-rotational symmetrical component of the total power absorbed by the fault. According to the laws of the theory of unbalanced circuits, a relay connected in this manner always operates if a fault is accompanied by an unbalancing of the voltages between phases.

Furthermore, the action of the relay shown in this figure is more positive according as the distortion of the voltage is greater. It follows, therefore, that if the movable element of the relay is provided with a time-element arrangement, such as the usual dash-pot or the eddy-current retarding means employed in induction type relays, the relay will operate the more quickly the nearer it is to the fault. This arrangement lends itself to the protection of ring-type systems or to parallel feeders, and presents the advantage of an automatic time-element in the operation of the relay which is a function of the distance of the relay from the fault, thus providing a selective disconnection of only the feeder section nearest the fault.

Although the arrangements shown are three-phase systems, the principles may be applied to polyphase systems having any number of phases.

The arrangement of a wattmeter relay responsive to the direct-rotational symmetrical component is shown in Fig. 1 in which the secondary windings of the current transformers $T_1$ and $T_2$ are connected in opposition, as are the secondary windings of transformers $T_3$ and $T_4$. To the terminals A, B of the transformers $T_1$ and $T_2$ is connected a non-inductive resistor and to the terminals B, C of the transformers $T_3$ and $T_4$ is connected an impedance comprising a non-inductive resistor and an inductive reactor of such combined value that the current therein between the terminals B, C lags 60° with respect to the voltage impressed thereon, the absolute values of the impedances in the circuits A—B and B—C being equal. The impedances connected to the transformers $T_1$—$T_4$ constitute a phase-sequence net work which segregates the direct-rotational symmetrical component of the currents of the circuit.

The current winding 6 of the wattmeter relay 5 is actuated by the voltage derived from the points A and C. The voltage winding 7 of the relay is connected conjointly to two voltage transformers $U_1$ and $U_2$. The secondary circuits of the voltage transformers have two common points D and E which are connected with the winding of the relay. The secondary circuit of the transformer $U_1$ contains a non-inductive resistor and that of transformer $U_2$, an impedance comprising a non-inductive resistor and an inductive reactor of such value that the current flowing in the secondary of the transformer $U_2$ lags 60° with respect to the current flowing in the secondary of the transformer $U_1$, while the absolute value of the resistor connected in the secondary circuit of the transformer $U_1$ is equal to the absolute value of the impedance connected in the secondary circuit of transformer $U_2$. The impedances connected to the transformers $U_1$ and $U_2$ constitute a phase-sequence network which segregates the direct-rotational symmetrical component of the voltages of the circuit.

For an assumed direction of phase rotation of the circuit, the wattmeter relay 5, connected as shown in Fig. 1, will be controlled only by the direct-rotational symmetrical component of power. It should be noted that the number of transformers connected in the lines may be reduced to three by the use of two auxiliary transformers having two primary windings, each of which is traversed by current from one of the current transformers and a single secondary winding traversed by a current proportional to the difference between the two primary currents.

The arrangement of a wattmeter relay responsive to the counter-rotational symmetrical component of power is shown in Fig. 2 and differs from that shown in Fig. 1 by the reversal of the resistors and reactors connected in the secondary circuits of the current and voltage transformers in order to obtain the negative or counter-rotational components instead of the positive phase-sequence components.

Figure 3:
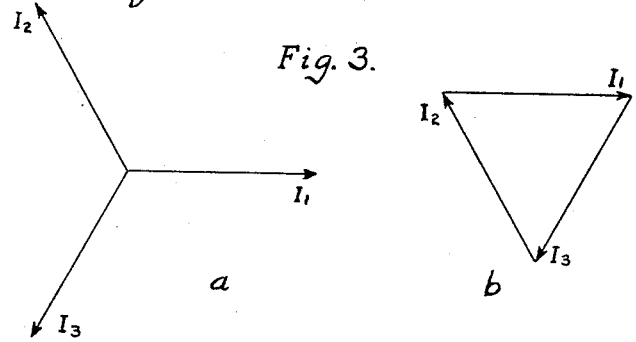
Figs. 3 and 4 are vector diagrams showing the currents in a balanced and in an unbalanced system, respectively.

Since the schemes described in Figs. 1 and 2 utilize only the positive and negative phase-sequence components, respectively, it is highly desirable to eliminate the zero sequence components from the protective relay and its associated impedance network. This result is accomplished by cross-connecting the secondaries of the pairs of transformers $T_1$—$T_2$ and $T_3$—$T_4$, respectively. The connecting of the transformers in this manner will eliminate the zero sequence components from the associated apparatus but not from the system itself, as may be seen with reference to the vector diagrams of Figs. 3 and 4.

Fig. 3a represents the current vectors for the three phases 1, 2 and 3 of the polyphase system. The vectors are designated as $I_1$, $I_2$, $I_3$ and the system is assumed to be a balanced system, therefore making the phase angle between any of the phases equal to 120°.

The theory relating to the occurrence of phase-sequence components in a polyphase system is well defined and the several components may be clearly represented by vector analysis. According to definition, the zero sequence component in any one phase of a three-phase system is represented as $$I_{10} = \frac{I_1 + I_2 + I_3}{3}$$

where all of the currents are considered as vectors. Similarly, the respective zero sequence components of current in phases 2 and 3 may be defined as one third of the sum of the current vectors of the system.

As shown in Fig. 3b, the sum of the current vectors in a balanced three-phase system is zero and, therefore, no zero sequence components exist.

In Fig. 4a, a condition of unbalance between the phases 1, 2 and 3 is assumed, and current vectors $I_1$, $I_2$ and $I_3$ are shown in an unbalanced condition.

Fig. 4b represents the vector sum of the three currents shown in Fig. 4a. According to the above definition, the zero sequence component of current in each phase is equal to one third of the vector sum of the total currents. The zero sequence component of current for phase 1 is, therefore, indicated as $I_{10}$.

For additional clarity, the three zero sequence vectors may be represented as shown in Fig. 4c wherein $I_{10}$, $I_{20}$, and $I_{30}$ are shown to be of equal magnitude and direction.

Figure 4:
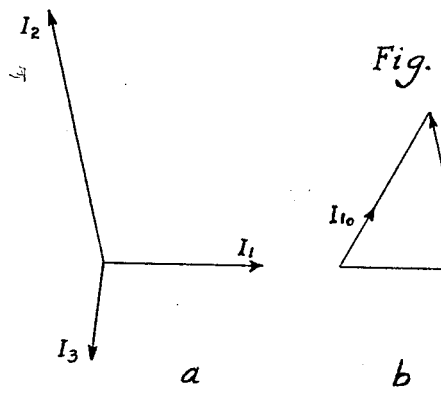
Figure 4:
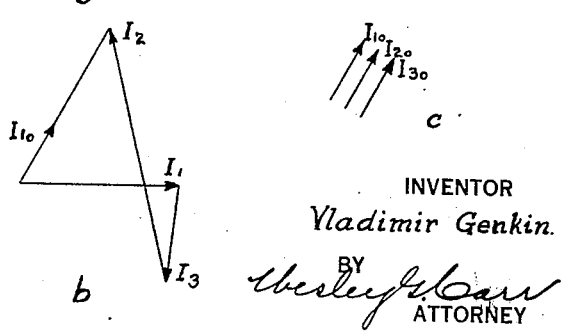

It is obvious that, in the unbalanced system described in Fig. 4, such components are present in the current transformers $T_1$, $T_2$, $T_3$, and $T_4$. The cross-connecting of the secondaries of these transformers provides a path enabling the zero components circulate, thereby eliminating them from the associated protective system. Vectorially, this amounts to the reversal of one or more of the zero sequence vectors, depending on the number of transformers which are cross-connected. Obvious changes may be made to the schemes shown and described by one well versed in the art and I do not wish this invention to be limited otherwise than as indicated in the appended claims.

I claim as my invention:

1. In a polyphase system, the combination with an electro-responsive device, of means for energizing said device from said circuit in accordance with symmetrical phase-sequence components of voltage and also of current free of the zero-current component, including a plurality of voltage transformers in line-to-line relation and a plurality of current transformers connected in reverse relationship to neutralize the zero component.

2. The combination with a polyphase circuit and an electro-responsive device, of means including a plurality of sets of series transformers, each set having primary windings connected in different phase conductors of the circuit and secondary windings connected opposed for eliminating zero-sequence currents from the device.

3. The combination with a polyphase circuit, of means including a plurality of sets of series transformers, each set having primary windings connected in different phase conductors of the circuit and secondary windings connected opposed for eliminating or neutralizing zero-sequence currents in the circuit, means responsive to the last-named means for sifting out another symmetrical phase-sequence component of current from the circuit, and a device responsive to the phase-sifting means.

4. The combination with a three-phase circuit, of two sets of current or series transformers, one set consisting of two transformers having the primary winding of one transformer connected in series-circuit relation with one conductor of the circuit and having the primary winding of the other transformer connected likewise in the second conductor of the circuit and having the secondary windings of both transformers connected opposed to each other, the other set consisting of two transformers having the primary winding of one transformer connected in series-circuit relation with the second conductor of the circuit and having the primary winding of the other transformer connected likewise in the third conductor of the circuit and having the secondary windings of both transformers connected opposed to each other, and another electrical device connected to the secondary windings of both sets of said transformers.

In testimony whereof, I have hereunto subscribed my name this twenty-eighth day of November, 1924.

VLADIMIR GENKIN.